J. E. JOHNSON & C. H. OSLUND.
BOTTLE SEAL LABELING MACHINE.
APPLICATION FILED MAR. 30, 1917.

1,300,408.

Patented Apr. 15, 1919.
9 SHEETS—SHEET 1.

Inventors
J. E. Johnson.
C. H. Oslund.

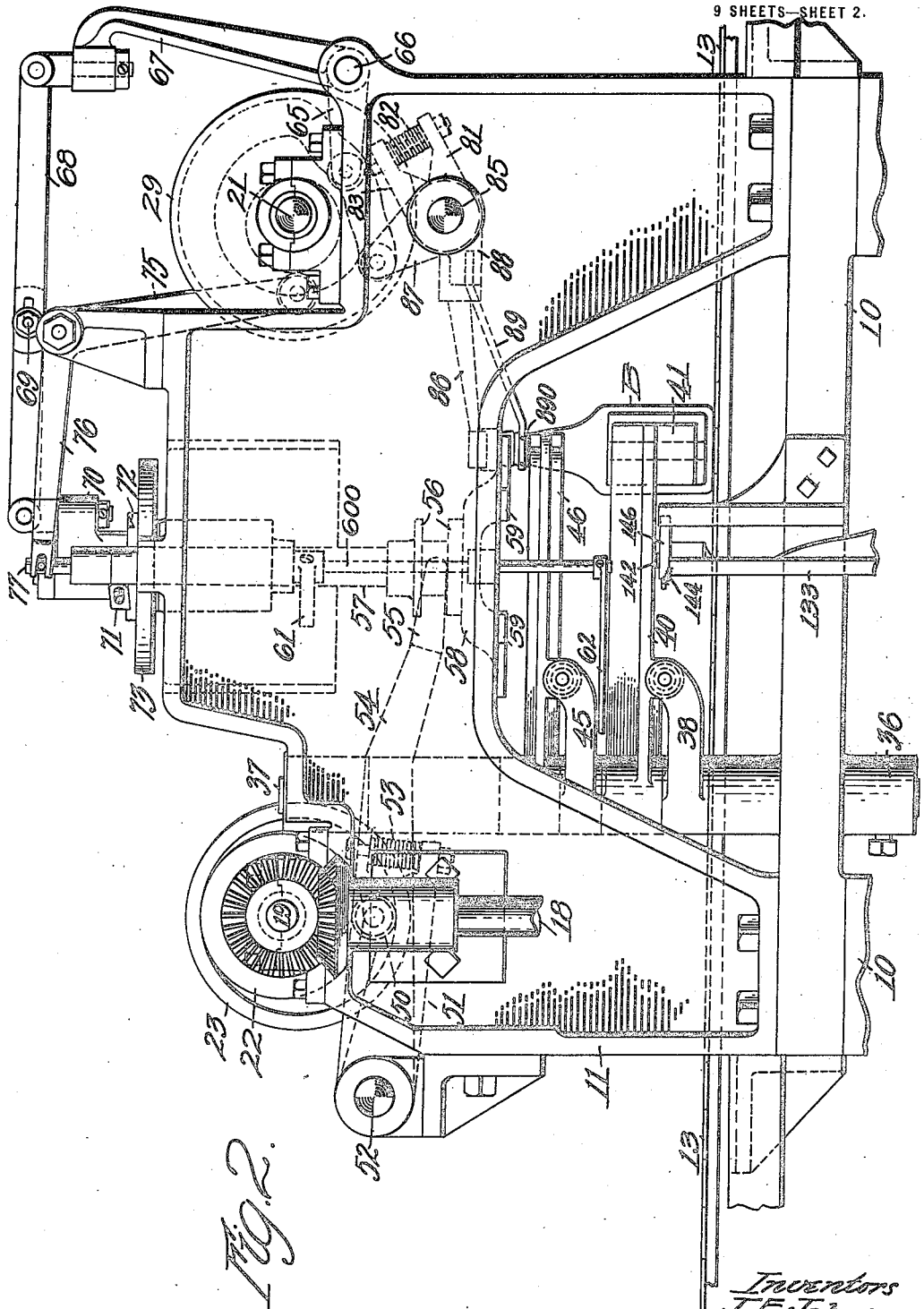

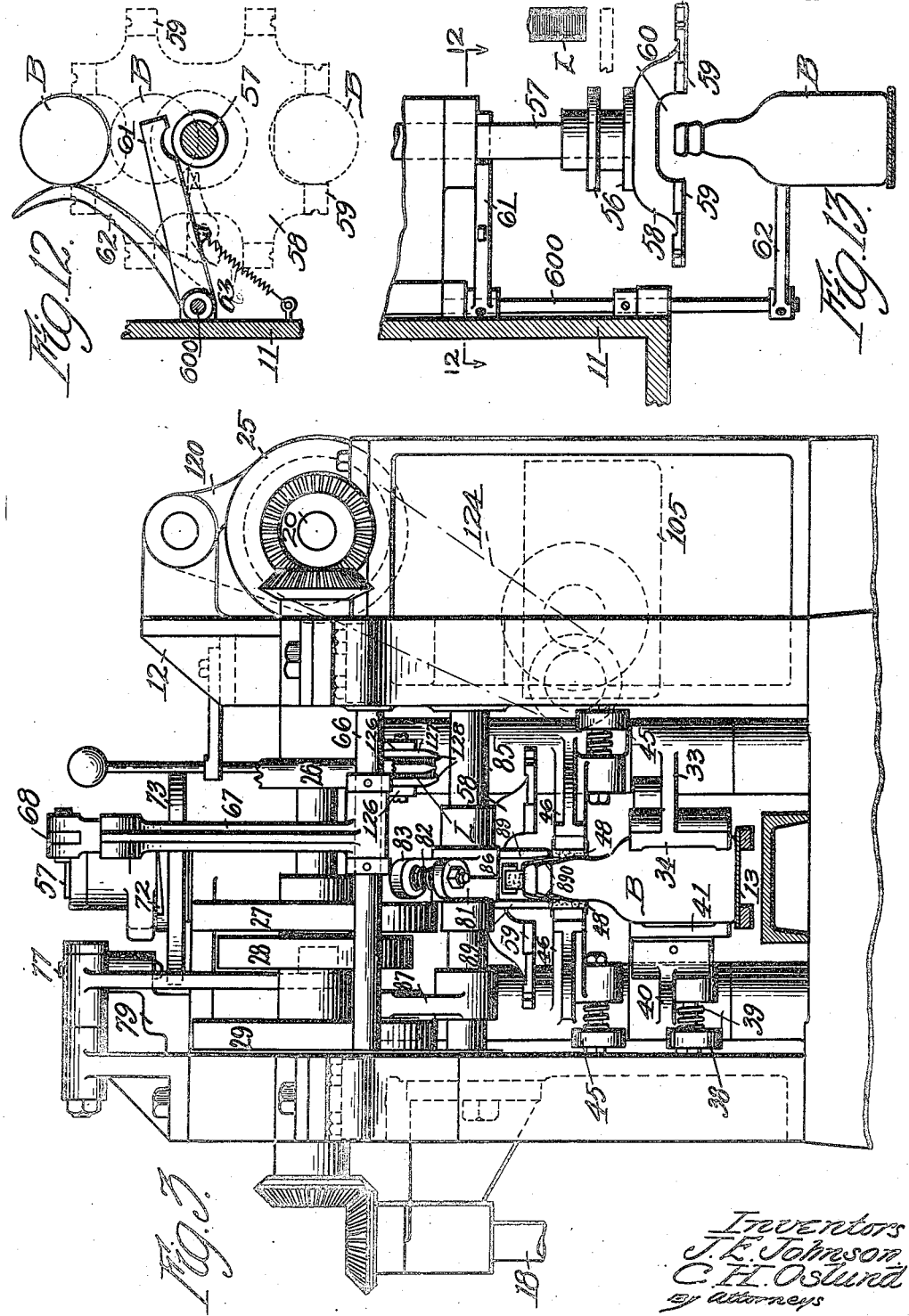

J. E. JOHNSON & C. H. OSLUND.
BOTTLE SEAL LABELING MACHINE.
APPLICATION FILED MAR. 30, 1917.
1,300,408.
Patented Apr. 15, 1919.
9 SHEETS—SHEET 4.
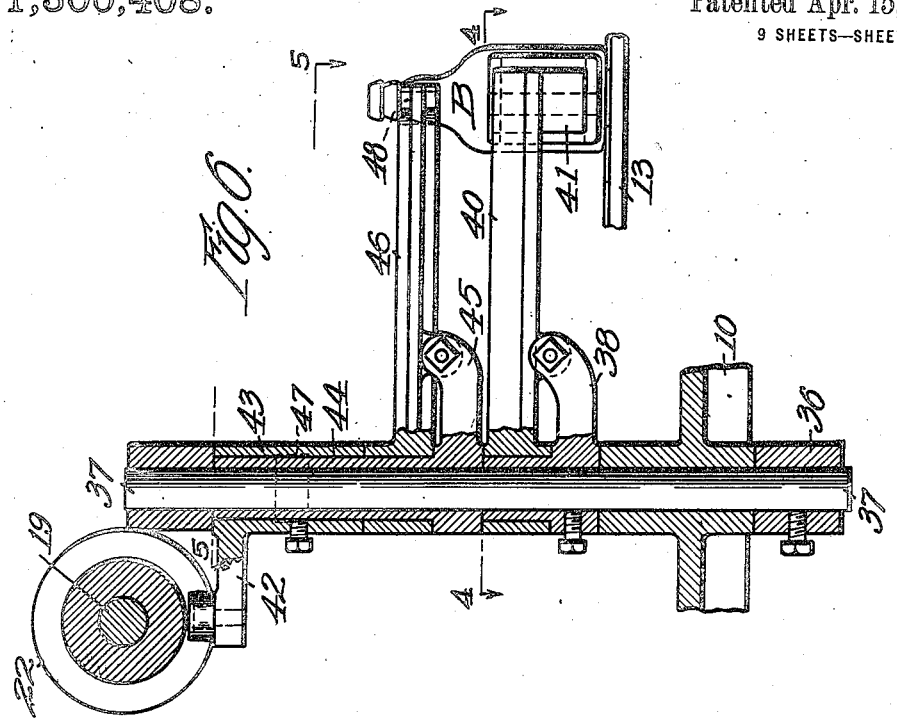
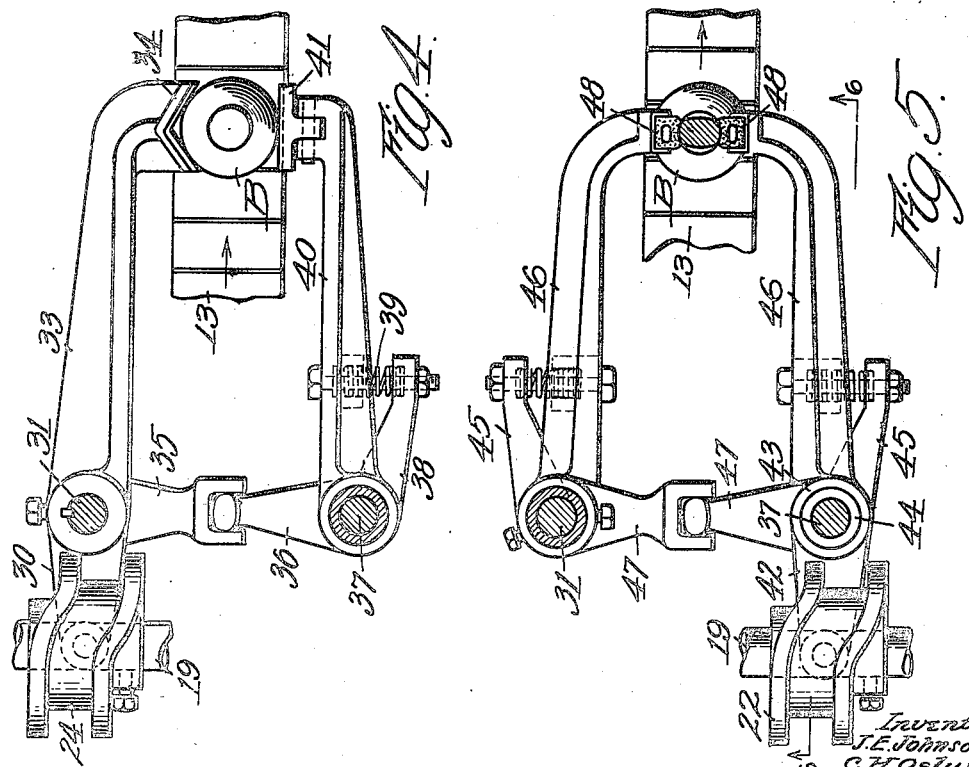
Inventors
J. E. Johnson
C. H. Oslund
By attorneys J. E. JOHNSON & C. H. OSLUND.
BOTTLE SEAL LABELING MACHINE.
APPLICATION FILED MAR. 30, 1917.
1,300,408.
Patented Apr. 15, 1919.
9 SHEETS—SHEET 5.
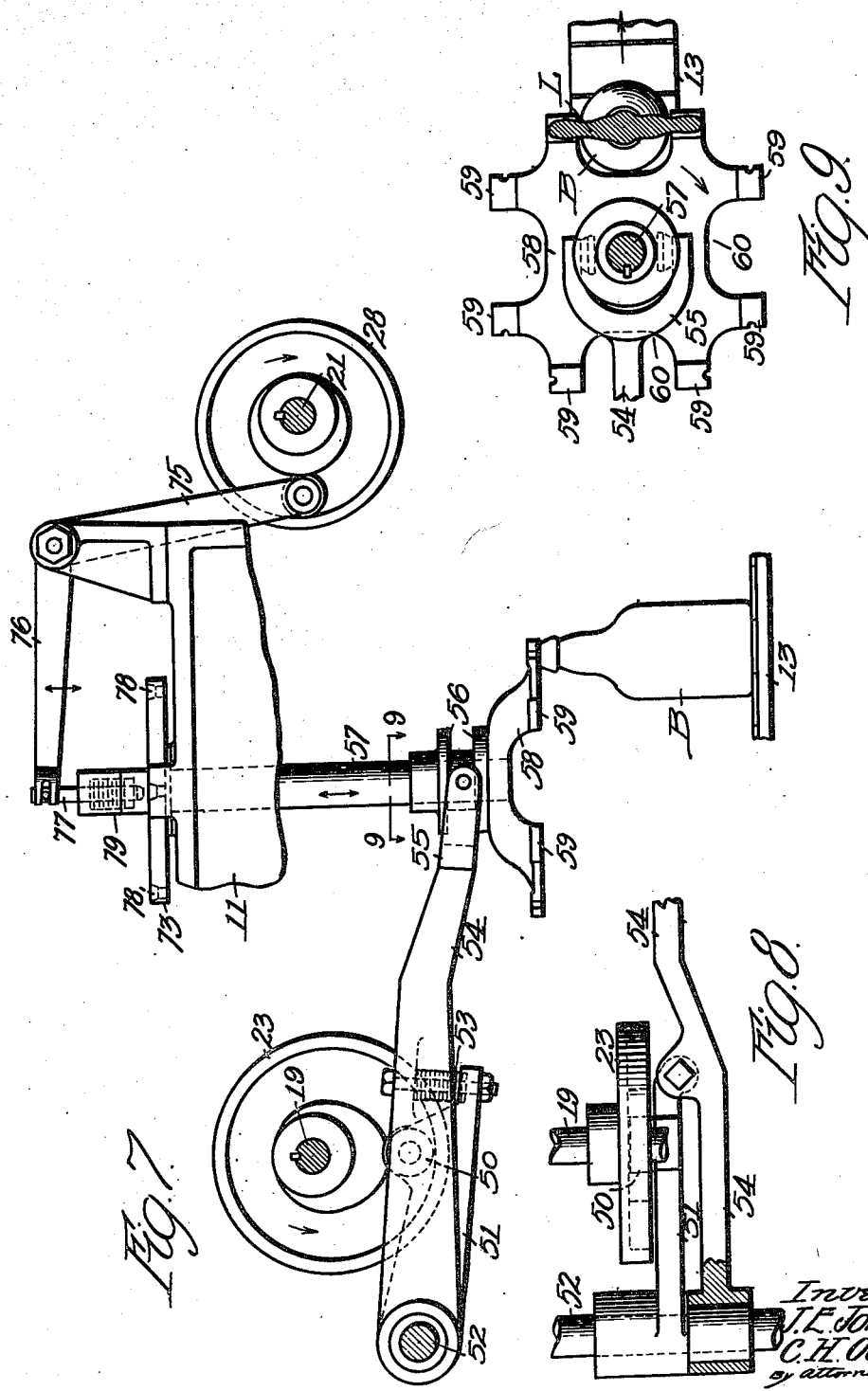

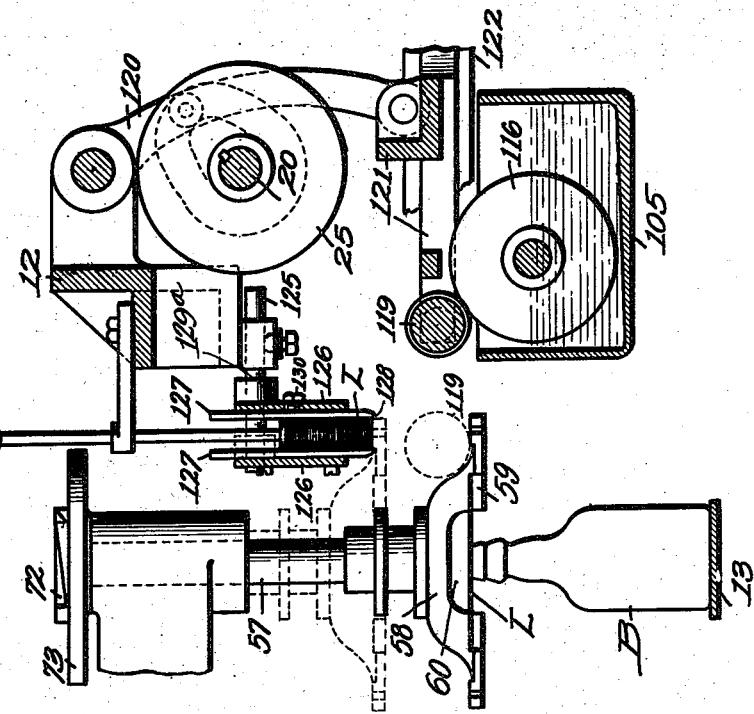
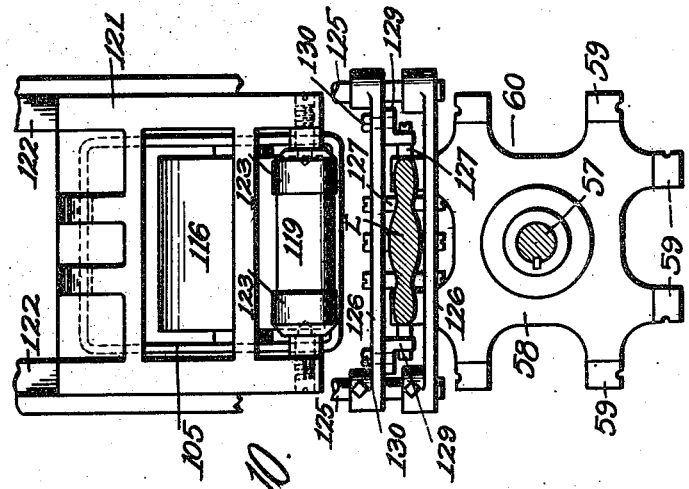

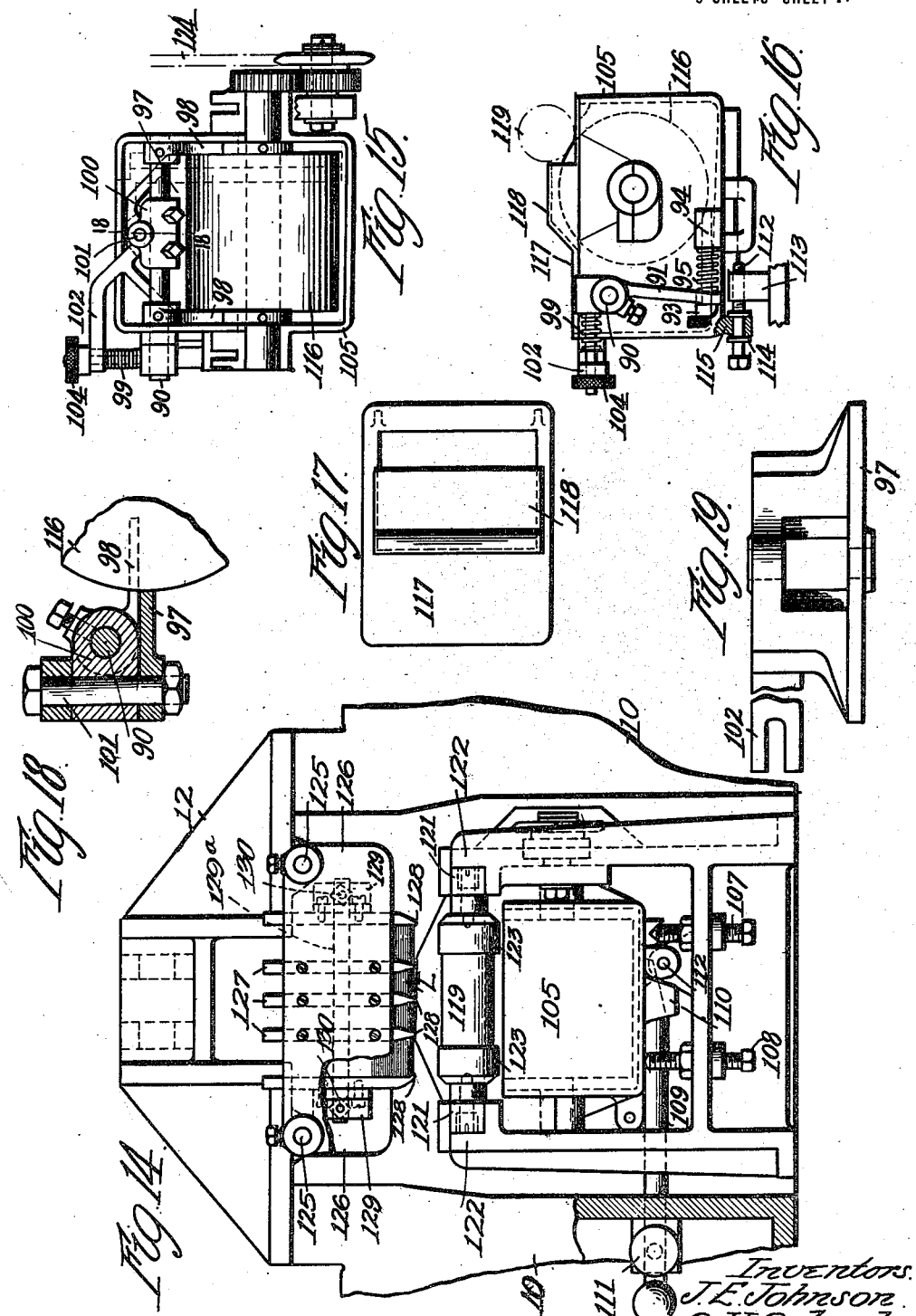

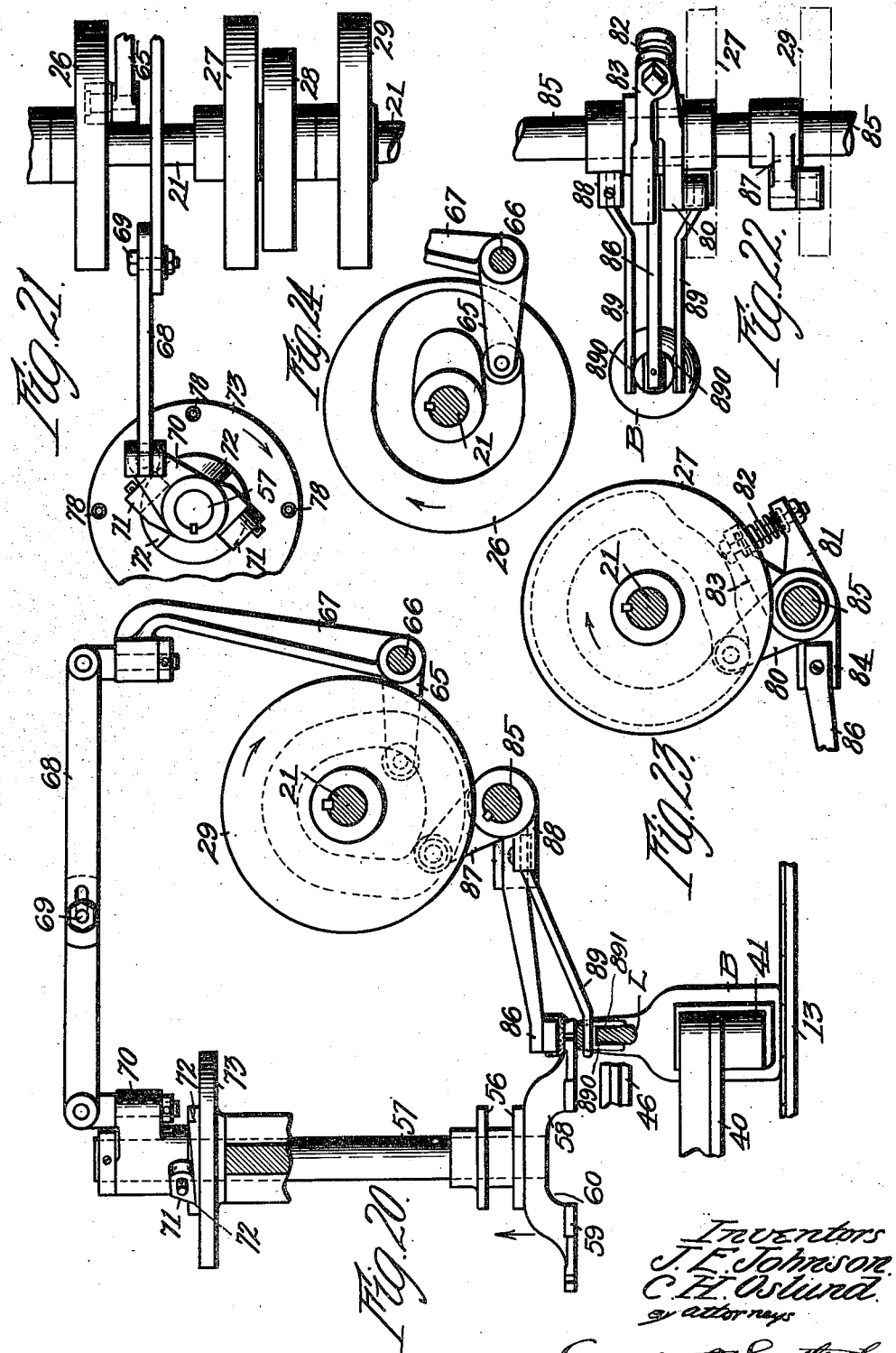

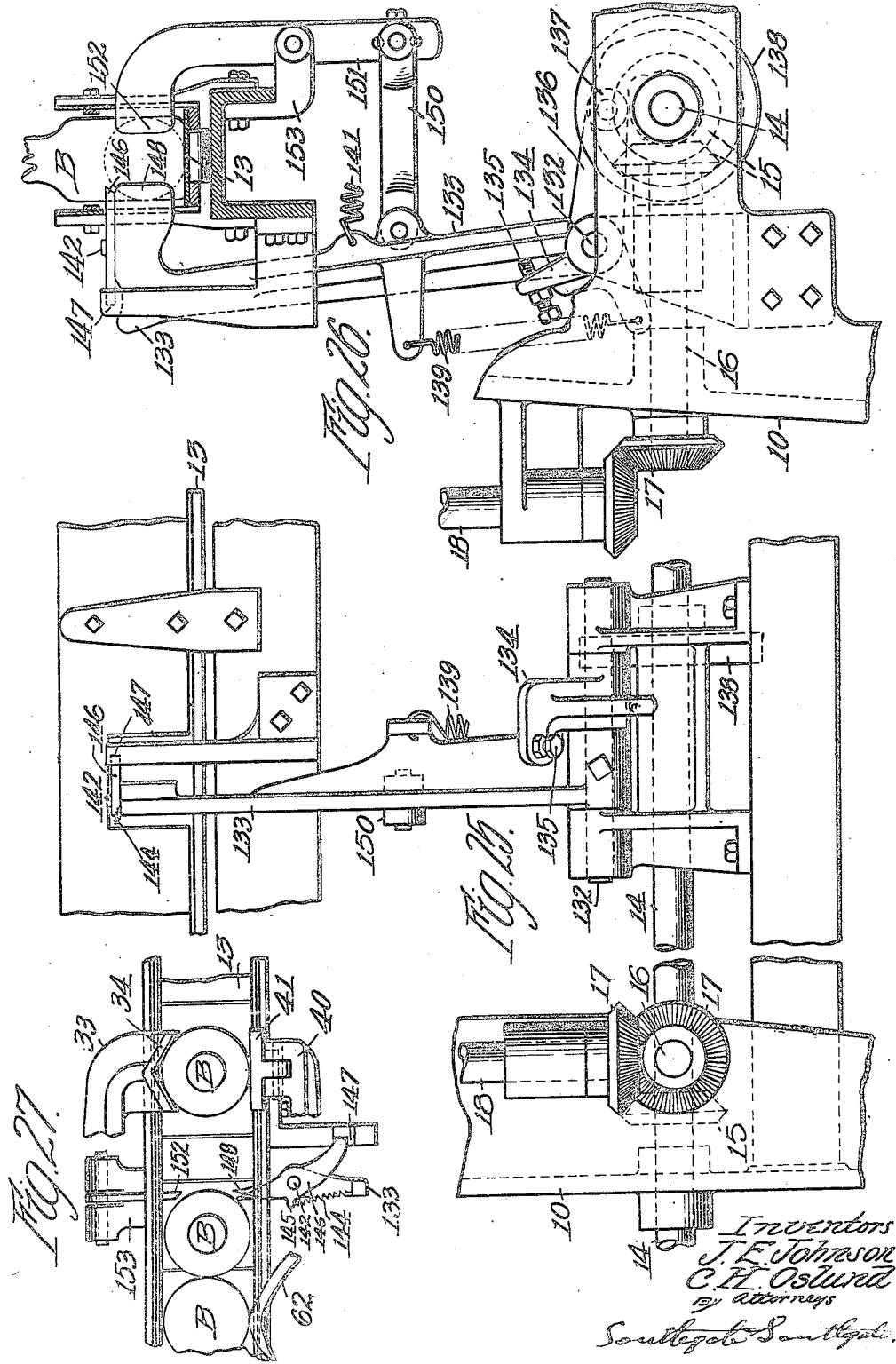

UNITED STATES PATENT OFFICE.

JOHN EMANUEL JOHNSON AND CHARLES H. OSLUND, OF WORCESTER, MASSACHUSETTS, ASSIGNORS TO THE O. & J. MACHINE COMPANY, OF WORCESTER, MASSACHUSETTS, A CORPORATION OF MASSACHUSETTS.

BOTTLE-SEAL-LABELING MACHINE.

1,300,408.     Specification of Letters Patent.    Patented Apr. 15, 1919.

Application filed March 30, 1917. Serial No. 158,707.

*To all whom it may concern:*

Be it known that we, JOHN EMANUEL JOHNSON and CHARLES H. OSLUND, said JOHNSON being a subject of the King of Sweden and said OSLUND a citizen of the United States, both residing at Worcester, in the county of Worcester and State of Massachusetts, have invented a new and useful Bottle-Seal-Labeling Machine, of which the following is a specification.

This invention relates to a machine for applying seals or labels to the tops of bottles, so that they will extend over the cap or cork and down on the sides of the bottle neck to which their ends adhere.

The principal objects of the invention are to provide means for this purpose adapted to apply labels to the tops of bottles passing it on a conveyer, preferably of the endless type; to provide means for gripping each bottle on the conveyer and holding it in a fixed position; means whereby said gripping device will act yieldingly so as to avoid crushing or breaking the bottle, and yet to hold the bottle in a certain definite position; to provide means whereby while in that position, the label will be taken from the label holding device by a previously gummed picker, and brought down over the top of the bottle in position for its center to rest on the center of the top of the bottle; to provide means for then bending the ends of the pasted label down on the sides of the bottle neck, and means for thereafter pressing the label firmly against the sides to stick it in position; to provide a simple device for gripping the center of the label to hold it firmly on the top of the bottle before the ends are pressed down; to provide an improved arrangement for operating and controlling the picker; to provide an efficient timing-lever for assuring the passage of the bottles to the bottle gripping device in proper order, and at exactly the correct time; an improved gumming device and an improved transfer arrangement for transferring the gum to the picker; and to provide improvements in the details of each of these mechanisms and in the way in which they coöperate.

The invention also involves improvements in the construction of the machine itself, the frame, and the method of supporting the various parts and driving them with proper relation to each other.

Reference is to be had to the accompanying drawings, in which—

Fig. 2 is a side elevation of the same;

Fig. 3 is an end elevation thereof;

Fig. 4 is a plan of the mechanism for operating the bottle grip, the shaft being shown in section on the line 4—4 of Fig. 6;

Fig. 5 is a similar plan of the label presser operating mechanism, with parts in section on the line 5—5 of Fig. 6;

Fig. 6 is a sectional view on the line 6—6 of Fig. 5 showing both the bottle grip and label presser mechanism;

Fig. 7 is a side view of certain parts of the picking mechanism;

Fig. 8 is a plan of the picker lever for operating the picker mechanism;

Fig. 9 is a plan of the picker itself, showing the label in position thereon, ready to be placed on the bottle;

Fig. 10 is a plan of the gumming mechanism showing the transfer and picker in position for receiving a label;

Fig. 11 is an elevation of the same with parts in section;

Fig. 12 is a plan of mechanism for preventing the operation of the picking mechanism when no bottle is in position for receiving a label;

Fig. 13 is a side elevation of the same;

Fig. 14 is an elevation of the gumming mechanism;

Fig. 15 is a plan of the paste pot;

Fig. 16 is a side elevation of the same;

Fig. 17 is a plan of cover of the paste pot;

Fig. 18 is an enlarged sectional view on the line 18—18 of Fig. 15;

Fig. 19 is an end elevation of the scraper;

Fig. 20 is an elevation of the label grip and bending connections, parts being shown in section on the line 20—20 of Fig. 1;

Fig. 21 is a plan of the cams for operating these devices shown connected up in one case;

Fig. 22 is a plan of the bender and label grip cams;

Fig. 23 is an elevation of the cam for controlling the label gripping device and its operated parts;

Fig. 24 is a similar view of the cam for controlling the intermittent rotary motion of the picker;

Fig. 25 is a side elevation of the timing-lever and connected parts;

Fig. 26 is an end elevation of the same, and

Fig. 27 is a plan thereof.

*General construction.*

Figure 1:
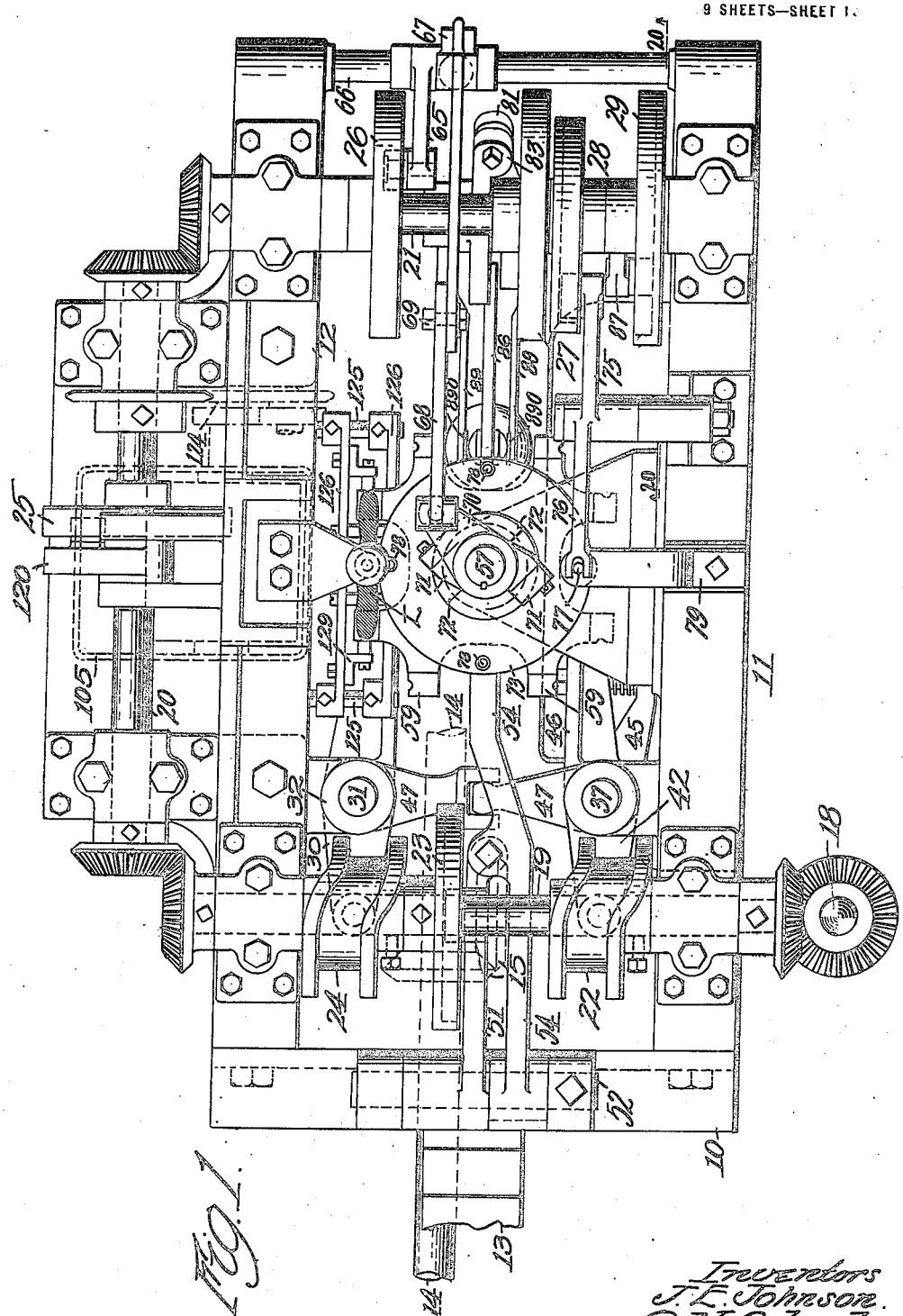
Figure 1 is a plan of a machine constructed in accordance with this invention.

The machine is shown in the drawings as mounted on a frame 10 which is provided with two parallel bridges 11 and 12 extending lengthwise of the frame and on opposite sides of a traveling conveyer 13 of the endless type, for supporting the bottles and taking them to and from the machine. No means is shown herein for operating the conveyer. It is intended to be operated constantly to continually bring bottles to the labeler and take them away.

The machine is operated by power delivered in any desired way to a longitudinal shaft 14 from which power is transmitted by bevel gears 15 to a cross shaft 16 at the bottom of the machine. This by bevel gears 17 drives a vertical shaft 18 at one side of the machine and this by similar means operates a cross cam shaft 19. This shaft 19 drives a longitudinal transfer shaft 20 and this drives a second transverse shaft 21 at the other end of the machine. On the cam shaft 19 there are three cams, a label presser cam 22, a picker cam 23 and a bottle grip cam 24. On the shaft 20 there is a transfer cam 25 and on the shaft 21 there is a swivel cam 26, a label grip cam 27, a swivel lock cam 28 and a label bender cam 29. These shafts 19, 20 and 21 are shown as arranged to rotate at the same speed. These constitute all the shafts of the machine which rotate constantly. The other shafts shown are merely supports or rods which are in some cases stationary and in others oscillated.

In the form shown the parallel shafts 19 and 21 have one bearing on the front bridge 11, and the other bearing on the rear of the frame. The bridge 11 as indicated in Fig. 2 is provided with two opposite legs at its ends, and a higher part in the center for supporting the several parts of the machine at a distance from the bottom. The bridge 12 is similarly shaped for similar purposes although it does not support the shafts 19 and 21. The shaft 20 is supported in bearings on the frame beyond the rear bridge 12.

*Bottle grip and label presser.*

Referring now especially to Figs. 4, 5 and 6 it will be seen that the bottle grip cam 24 operates a roller arranged on an arm 30. This is secured to a vertical rod 31 that is mounted at its top and bottom in bearings 32 on the frame and is adapted to oscillate therein, on account of the operation of the cam. On this shaft is also fixed an arm 33 adapted to be adjusted circumferentially, and secured in position by a set-screw, so that the arm 33 moves with the arm 30. It is provided with a V-shaped jaw 34 for positively engaging the bottle B on the endless conveyer and providing a surface against which the bottle can be gripped as will now appear. Also fixed on the shaft 31 by a set-screw is another arm 35 which constitutes with the arm 33 a bell crank and has a notch in which it receives the end of an arm 36 that is fixed by a set-screw or the like on a vertical shaft 37. This shaft 37 has fixed on it in the same way an arm 38 connected by a spring and rod 39 with an arm 40 oscillatable about the shaft 37 which supports it. The arms 36 and 38 constitute a bell crank. This arm 40 is provided with a pivoted end 41 adapted to be forced by the mechanism just described into contact with the side of the bottle to yieldingly press the bottle up against the V-shaped jaw 34. This holds the bottle in fixed position on the continuously running conveyer without stopping the conveyer during the application of the label.

At this time we will describe another feature connected with the above described mechanism but not operating at the same time. The cam 22 operates an arm 42 similar to the arm 30 and supported by a sleeve 43 on the shaft 37 but not rotating or operating therewith. This sleeve is adjustably fixed, as by a set screw to a bushing 44 loose on the shaft 37. This bushing is provided with an arm 45 operating in the same way as the arm 38 to operate yieldingly an arm 46. Another arm 45 on the shaft 31 is connected with it by two arms 47 and provided with a second spring-pressed arm 46. These two arms 46 therefore operate together, both yieldingly. Each one is provided on its end with a rubber label presser 48 shown as being hollow in this case, so as to make them yield readily. A piece of rubber tubing or hose can be used for this purpose. It will be seen that by an operation similar to that described in connection with the bottle grip, these two label pressers will be forced yieldingly against opposite sides of the bottle, or in this case the neck, so as to press the label against the same and permanently stick its gummed ends in place.

*Picker and swivel lock.*

Referring now especially to Figs. 7, 8 and 9, it will be seen that the picker-cam 23 on the shaft 19 operates a roll 50 on an arm 51. This is freely pivoted on a cross rod 52 and has a spring and rod connection 53 with an arm 54, also freely pivoted on the rod 52. The operation of the cam 23 will result in yieldingly moving the arm 54 up and down. This arm is provided with a yoke 55 which engages between two collars 56 on a vertically reciprocating picker shaft 57 which carries at its bottom a picker-plate 58. This picker plate is provided, in the form shown in the drawings, with four pairs of picker-arms 59, each pair being adapted to receive paste and engage the opposite ends of a single label L and deposit it on the bottle. It will be noticed that the plate is recessed at points 60 between each pair of arms 59 to permit the arms to straddle the bottle and to come down on opposite sides of it clearing the neck in all positions of the device.

In order to prevent the operation of the picking device when there is no bottle in position to be labeled, the mechanism shown in Figs. 12 and 13 is employed. In this case on a vertical rod 600 are fixed two arms 61 and 62 virtually constituting a bell crank and a light spring 63 normally pulls them over to the right in Fig. 12, but the arm 62 is so curved that it can be held back by a bottle B in proper position, but if no bottle is located in that position, the arm 61 can come over into contact with the shaft 57 and prevent its being raised to the full limit of its stroke. The picker will be left at the upper end of its stroke in the dotted line position, at a distance from the bottom of the label holder, and will not pick the label therefrom.

The shaft 57 is designed to be intermittently rotated in the present case 90 degrees at each operation. For this purpose the cam 26 on the shaft 21 operates an arm 65 pivoted on a cross-rod 66 and fixed to an upwardly extending arm 67 (Fig. 20) connected by a swiveled joint to a horizontal arm 68 consisting of two pieces adjustably connected together by a pin and slot connection at 69. This arm 68 therefore reciprocates horizontally and its outer end is connected by a swivel joint with an arm 70 adapted to oscillate freely about the shaft 57. The head of this arm is provided with two gravity pawls 71 adapted to engage teeth 72 arranged 90 degrees apart on the top of a disk 73 to which the shaft 57 is slidingly splined. At each reciprocation of the arm 68 one of the pawls will cause the disk 73 and the shaft 57 to rotate through a quarter of a revolution. This is done so that one pair of picker arms can be pasted on top while another pair is depositing a label on a bottle.

Turning back now to Fig. 7 it will be seen that the cam 28 is provided with means for operating an arm 75 and oscillating an arm 76 which is connected to it. This arm is provided with a lock-pin 77 supported by a bracket 79 at a distance from the center of the shaft 57 and adapted to engage in any one of four sockets 78 in the disk 73, to lock it in any one of its four positions, and hold the picker in one of the positions to have one pair of arms apply the label in position on the bottle.

Label grip.

The cam 27 is arranged to operate a lever consisting of two arms 80 and 81 relatively fixed together, and the latter is connected by a spring and pin connection 82 with an arm 83 which is fixed with respect to an arm 84 but pivoted on the upright horizontal rod 85 on which the lever 80—81 is pivoted. Extending from this arm 84 is a label grip 86 designed to press down yieldingly on the top of a bottle to hold the center of the label thereon.

Label bender.

In a similar way the cam 29 operates an arm 87 fixed to the rod 85, and on that rod are fixed two arms 88 each having a bender in the form of a rod 89 thereon. These are arranged to pass down at the sides of the bottle neck, and bend the ends of the label down thereon. These benders are provided with steering plates 890 having a notch 891 just wide enough to receive the end of the label between its ends to steer it straight down the bottle neck. The ends of the label being provided with gum as will appear hereinafter, they temporarily stick to the bottle neck, until they are pressed against it, by the label pressers 47 previously described.

Gumming and transfer device.

The gumming device as shown in Figs. 14 to 19 inclusive constitutes an improvement over the pasting mechanism illustrated in our prior application for Patent Serial No. 112,706, filed Aug. 2, 1916. It is designed to apply paste or gum to the picker arms.

In this case the paste-pot 105 is provided with a V-shaped notch along the bottom, in which fit the ends of two set-screws 107 and a third set-screw 108, engages the bottom at another point so as to give a three point support to the paste-pot, and permit of its being leveled up. It is held in its adjusted position by a pin 109 having a slanting end entering under or into a similarly shaped slot in a lug 110 on the bottom of the pot. The pin can be held in its adjusted position, by thumb-screw 111. The whole pot can be adjusted back and forth by screw 112 screwing into a fixed lug 113 on the frame. The screw is provided with a double collar 114 entering a slot in a lug 115 on the bottom of the paste-pot. The drum 116 therein is of the ordinary character, driven by a chain 124, from the shaft 20.

The paste pot has a cover 117 with an offset 118 for receiving the top of the drum 116.

Passing through the paste pot is a shaft 90 having an arm 91 extending down and engaging a nut 93 on a screw 94. This screw is fixed in a lug on the paste pot. A spring 95 on the screw holds the arm 91 against the nut. This provides for adjusting and yieldingly holding the shaft 90.

On the shaft 90 are fixed two blades 98 for scraping the ends of the drum 119. By means of a pivot bolt 101 a blade 97 for scraping the circumference of the drum is held against the bottom of a hub 100 which is secured to the shaft 90 by set screws in a recess in the hub 100. It is connected with a frame 102 which is pivotally adjusted by a screw 104 operating against a spring 99. This adjusts the blade 97 so as to bring it into uniform contact with the drum throughout its length if desired while it is adjusted as a whole toward or from the drum by the screw 94. The latter adjustment regulates the thickness of the film of paste and the former its uniformity across the drum. This cam 25 operates a lever 120 pivoted on a lug on the bridge 12 and operating a slide 121 on ways on 122 on the frame. The roll 119 moves into contact with the paste drum. Its enlarged ends 123 deliver paste to one pair of picker arms 59 that are then in proper position as shown in Fig. 11. The paste roll then moves back out of the way and allows the pickers to move up from the full to the dotted line position.

The label holder is also mounted on the bridge 12 by means of a pair of rods 125 and comprises a front and rear wall 126 each carrying secured to its inner surface a series of members 127 provided with hooks 128 at the bottom for supporting the labels, the labels being piled up on these hooks between the members 127. In this case two end hooks are shown, supported by brackets 129 adjustably mounted in slots 129ª in the back wall 126 being secured by screws 130 thereto. The features of the label holder are similar to those shown in our above identified application, except those above described.

*Timing mechanism.*

The timing mechanism shown herein, is taken in part from our prior application Serial No. 112,705, filed August 2, 1916, and is designed for insuring against two bottles going to the grippers together or at other than the regular prescribed intervals. On the frame of the machine, as in that case, is mounted an oscillatable rod 132 on which is keyed an arm 133 standing upright. A set-screw is shown for fastening it to the rod or shaft 132. Freely pivoted on this rod is a bracket 134 having an adjustable stop screw 135 for engaging the arm 133 and causing it to partake of its motion. This bracket 134 is provided with a fixed arm 136 extending in the opposite direction and having a roll 137 thereon engaging a cam 138 mounted on the shaft 14. This cam raises and lowers the arm 136 and rocks the bracket 134 about the shaft 132 at regular intervals and is timed in proper relation to the cam 24 so that the bottles will be allowed to pass to the bottle grip just in time to be received by it as it starts to close.

This cam throws the arm 133 forward each time the roll 137 is pulled down. The spring 139 pulls the arm 133 back into contact with the screw 135. Another spring 141 pulls the arm in the opposite direction except when the spring 139 is stretched by the motion of the bracket 134.

The arm 133 is provided at its top with a stud 142. A spring 144 connected with the arm 133 and with a projection 145 on a latch 146 is pivoted on this stud 142 and tends to hold the stud in this position. The latch has a tail which is adapted to move over a tooth 147 on a fixed bracket, but the arm 133 rocks inwardly toward the conveyer normally a plurality of times at each rotation of the shaft 14. The latch 146 moves beyond the teeth 147, shown in Fig. 27, and locks the arm 133 in that position so that the next time the roll 137 is raised the screw 135 will simply move back away from the arm 133 extending the spring 139, but will not take the arm with it. When a bottle engages the latch 146, as indicated in Fig. 27, the latch will be forced to turn on its pivot 142 out of the position shown in that figure and unlock the arm 133. Then the projecting end 148 on the arm 133 is withdrawn by the cam 138 the next time that comes around to the proper position to accomplish this result. Therefore each bottle will be fed forward at exactly the proper time to be stopped by the gripping means.

All this is as described in the above mentioned application, but it will be obvious that whenever a bottle fails to come into proper position to release the latch 146 the projecting end 148 of the arm 133 will not be withdrawn, and consequently, a bottle coming along at the middle of an interval cannot be fed past this projection, but will have to wait until the next operation of the arm 136. The latch 146 is placed high enough so that if a bottle comes along in horizontal position it will not touch and trip the latch. Thus it constitutes a safety device. According to this invention an additional feature is provided to avoid the possibility of an extra small bottle getting by the projection 148. For this purpose the arm 133 is provided with a link 150 connected with a lever 151 having an end 152 projecting into the raceway over the conveyer directly opposite the end 148. This lever is pivoted on a bracket 153 carried by a frame under the conveyer. It will be obvious that the two ends work inwardly together and outwardly together, so that they insure the retention of every bottle that comes into place ouside the regular intervals.

Operation.

The operation is as follows:—The bottles come along on the belt being stopped, timed and started by the mechanism shown. The bottle grip operates to hold a bottle while the label is being applied. Assuming that the picker is in a position down over a bottle with a label, the transfer roll 119 is just about to go in to get gum. The label grip is coming down on the label, and so are the label benders. The label pressers have not yet come into action. The swivel lock holds down to keep the picker in position and the timing lever holds closed. All these functions are being carried out at once. Immediately thereafter the label grip gets hold of the label then the label benders come down over its ends and stay down, the pressers then move against the two ends of the label. The swivel still holds. The label benders go up and the pressers continue to press against the label. The label grip then goes up, and the label benders remain up. Then the picker starts down, the label pressers go out of operation, while the swivel lock releases and then holds up. The bottle grip releases and the timing lever opens. The picker then turns with the swivel 90 degrees while the swivel lock holds up. The label grip remains up, the bottle grip moves in to grip the next bottle, and the swivel lock drops down and holds the picker in its new position and the timing lever holds up. The swivel still holds and the picker completes its downward motion, so as to leave a label on the top of the bottle ready for the several operations to be repeated.

It will be seen therefore, that this provides a compact and mechanical machine for automatically applying top labels to bottles and fixing them thereto. It will be seen also that the construction involves a convenient and practicable label pressing device for securing the ends of the labels to the bottle, means for operating the label grip for holding the center of the label thereon, and that the picker is especially adapted to this type of labeling. Furthermore the bottle grip is timed so as to hold the bottle on the constantly moving conveyer while the label is being applied, and the mechanism for pasting is also new. It will be seen furthermore that the gumming device itself, and the timing device constitute improvements over the mechanism shown in our above mentioned applications and furthermore the coöperation of the timing lever and bottle grip is an entirely novel feature for without it bottles would pass the grip without being labeled and some might be caught improperly and crushed.

Although we have illustrated and described only a single form of the invention, we are aware of the fact that many modifications can be made therein and the parts combined in other ways without departing from the scope of the invention, as expressed in the claims. Therefore, we do not wish to be limited in these respects, but what we do claim is:—

1. In a labeling machine, the combination of a conveyer for supporting and carrying articles to be labeled, means for gripping an article while on said conveyer, and holding it in the stationary position to which the conveyer has carried it without stopping the conveyer, and means for applying a label to the article while held in that position.

2. In a labeling machine, the combination of a conveyer in the form of an endless belt moving continuously in a straight line, a frame located over said belt in position to cover it, means on said frame for gripping an article while being carried along by said belt and holding it in fixed position, means supported by the frame for applying a label to the article while held in that position, and means for then releasing the article while still in the same position and allowing it to be carried along by the belt from the machine.

3. In a labeling machine, the combination of a conveyer for supporting and carrying articles to be labeled, means for gripping an article while on said conveyer and holding it in the stationary position to which the conveyer has carried it without stopping the conveyer, and means for applying a label over the end of said article.

4. In a labeling machine, the combination of a horizontal conveyer movable continuously in a straight line for carrying bottles, a frame located over said conveyer, means on said frame for gripping a bottle while on said conveyer and holding it in fixed position while being labeled, so that it can be released in that position directly over the conveyer, and means on the frame for applying a label over the top of the bottle while so held.

5. In a labeling machine, the combination of a conveyer for carrying bottles or the like, a frame located adjacent thereto, means carried by said frame for stopping the bottles on the conveyer and releasing one bottle at a time to allow it to move along on the conveyer, means on said frame timed to grip each bottle so released, and means on the frame for applying a label on the end of the bottle while held by said grip device.

6. In a labeling machine, the combination of a horizontal endless conveyer continuously moving in a straight line for carrying bottles, a frame located over said conveyer, means mounted on said frame for periodically stopping the bottles on said conveyer without interfering with the operation of the conveyer and periodically releasing one bottle at a time, whereby the bottles will be equally spaced apart on the conveyer after passing said means, means carried by said frame and operably connected with said timing means for gripping a bottle released thereby and holding it in stationary position without stopping the conveyer, and means on the frame for applying a label on the end of the bottle while held by said grip device.

7. In a labeling machine, the combination of a continuously operating endless conveyer for carrying bottles or the like, a frame located over said conveyer, a shaft carried by said frame, means operated by said shaft for stopping the bottles on the conveyer and preventing them from moving forward with the conveyer and for periodically releasing one bottle at a time, means operated by said shaft for gripping a bottle after it has been released and holding it in position over the conveyer, said gripping means being timed to operate at a definite interval after the timing means has operated to release a bottle, and means on the frame for applying a label on the end of the bottle while held by said grip device.

8. In a labeling machine, the combination of a conveyer for carrying bottles, a frame located adjacent to said conveyer, means on said frame for gripping a bottle on said conveyer as it moves along and holding it in fixed position independently of the motion of said conveyer without moving it out of the position to which the conveyer takes it, means on the frame for carrying a label over the end of the bottle while so held, means for gripping the center of the label on the end of the bottle, and means for bending the ends of the label back upon the sides of the bottle.

9. In a labeling machine, the combination of a horizontal conveyer movable continuously in a straight line for carrying bottles, a frame located over said conveyer, means on said frame for gripping a bottle on said conveyer as it moves along and holding it in fixed position, means on the frame for carrying a gummed label over the top of the bottle while so held, means for gripping the center of the label on the top of the bottle, means for bending the ends of the label down along the neck of the bottle, and means for pressing the ends of the label against the bottle neck after they are bent down.

10. In a labeling machine, the combination of a conveyer adapted to carry bottles or the like, a frame located adjacent thereto, a picker on said frame, means for applying glue to two spots separated from each other on said picker, means for moving said picker into contact with a label for attaching the label to the picker, and for moving the picker toward a bottle to apply the central portion of the label thereto, means for then bending the pasted ends of the label on the bottle, and means for thereafter pressing said ends against the bottle to permanently attach the label thereto.

11. In a labeling machine, the combination of a movable picker, means for operating the picker, a pivoted arm, a spring for normally holding the arm in position to prevent the picker from moving into a position for receiving a label, and a second arm movable with the first arm for moving it against the resistance of the spring to allow the picker to act.

12. In a labeling machine, the combination of a conveyer for carrying articles to be labeled, a picker, means for operating said picker to move into a position to engage a label and carry it into labeling position, a pivoted arm, a spring for normally holding the arm in position to prevent the picker from receiving a label, and a second arm movable with the first arm, said second arm being located in position to be engaged by an article coming into position on the conveyer so as to hold the first arm out of operative position.

13. In a labeling machine, the combination of a conveyer for carrying articles to be labeled, a picker, means for operating said picker to move into a position to engage a label and carrying it into labeling position, a stop adapted to prevent the picker from moving into position to receive a label, means for stopping the articles on the conveyer and periodically releasing one of them, and means timed with respect to said stopping means for gripping and holding an article so released while the picker applies the label thereto.

14. In a labeling machine, the combination of a frame, two parallel bridges supported at their ends on said frame and extending up therefrom, two parallel shafts supported by said bridges at the ends of the frame, a longitudinal shaft carried by one of said bridges at the rear, said shafts being connected to rotate together, and bottle labeling mechanism operated by said shafts.

15. In a labeling machine, the combination of a conveyer for feeding bottles along a path, means for gripping a bottle and holding it in a certain position independently of the operation of the conveyer, a picker adapted to move a label over a bottle while held by said gripping means, an arm located in position to prevent the operation of said picker and another arm relatively fixed to the first arm and extending into a position to move the first named arm out of operation when the second arm is engaged by a bottle advancing along on the conveyer.

16. In a labeling machine, the combination of a conveyer for feeding bottles along a path, a picker adapted to move a label over a bottle, an arm located in position to prevent the operation of said picker and another arm relatively fixed to the first arm and extending into a position to move the first named arm out of operation when the second arm is engaged by a bottle advancing along the conveyer.

17. In a labeling machine, the combination with means for moving bottles along a path, of a pair of shafts, two relatively fixed arms pivoted on each of said shafts, one arm of each pair being connected with one arm of the other to cause them to oscillate simultaneously but oppositely, the other arm on one shaft having a jaw adapted to engage a bottle in said path, means connected with the corresponding arm on the other shaft for engaging the other side of the bottle and holding it against said jaw, and means for applying a label to a bottle while so held.

18. In a labeling machine, the combination with means for moving bottles along a path, of a pair of vertical shafts located on opposite sides of said conveyer, two relatively fixed arms pivoted on each of said shafts, one arm of each pair being connected with one arm of the other to cause them to oscillate simultaneously but oppositely, the other arm on one shaft having a jaw adapted to engage a bottle in said path, yielding means connected with the corresponding arm on the other shaft for engaging the other side of the bottle and holding it against said jaw, and means for applying a label to a bottle while so held.

19. In a labeling machine, the combination with means for moving bottles along a path, of a pair of vertical shafts located on opposite sides of said conveyer, a bell-crank construction pivoted on each of said shafts, one arm of each bell-crank being connected with one arm of the other to cause them to work simultaneously but oppositely, the other arm of one bell-crank having a jaw adapted to engage a bottle in said path, yielding means connected with the corresponding arm on the other shaft for engaging the other side of the bottle, means connected with said cam for oscillating the bell crank on one of said vertical shafts, and means for applying a label to a bottle while so held.

20. In a labeling machine, the combination with a pair of parallel shafts, two arms oscillatable on each shaft, the two arms of each pair being relatively fixed and one arm of each pair being connected together to cause the other arms to swing toward and from each other, means for oscillating the arms on one shaft, one of said arms having a V-shaped jaw, a freely swinging arm mounted on the other shaft, a spring for connecting it with one of the first named arms thereon, means on the free arm for engaging a bottle located against said jaw and yieldingly gripping it, and means for applying a label to a bottle while so held.

21. In a labeling machine, the combination of a pair of parallel shafts, means for oscillating one of said shafts, means for transmitting the oscillation to the other in the opposite direction, an arm projecting from each of said shafts and having ends arranged to extend toward each other and located in alinement, a pair of bottle grips on said arm for pressing against the opposite sides of a bottle, and means for applying a label to a bottle while so held.

22. In a labeling machine, the combination of means for holding a bottle in vertical position, a picker comprising a horizontal plate having a pair of parallel arms extending therefrom and spaced apart, means for applying paste to the upper surface of said arms simultaneously, means for then raising the picker into contact with a label for receiving the label on its pasted surface and then moving the picker down to bring the center of the label into contact with the top of the bottle, said raising and lowering means comprising a pivoted arm, means for positively oscillating said arm, an arm loosely mounted on the same axis, a spring connection between said arms, and a yoke on the last named arm for engaging the picker and imparting vertical motion to it.

23. In a labeling machine, the combination of means for holding a bottle in vertical position, a picker comprising a horizontal plate having a pair of parallel arms extending therefrom and spaced apart, means for applying paste to the upper surface of said arms simultaneously, a pivoted arm, means for positively oscillating said arm, an arm loosely mounted on the same axis, a spring connection between said arms, and a yoke on the last named arm for engaging the picker and imparting vertical motion to it.

24. In a labeling machine, the combination of a vertically reciprocable shaft, a picker mounted on the lower end of said shaft and having a plurality of sets of picker arms, a disk on said shaft having a plurality of teeth thereon, an oscillatable arm on said shaft having pawls adapted to engage said teeth and rotate the shaft a part of a revolution at a time, and positive means for oscillating said arm.

25. In a labeling machine, the combination of a vertically reciprocable shaft, a picker mounted on the lower end of said shaft and having a plurality of sets of picker arms, a disk on said shaft having an equal number of teeth thereon, an oscillatable arm on said shaft having pawls adapted to engage said teeth and rotate the shaft a part of a revolution at a time, a cam, an oscillating arm, means for operating the last named arm from said cam, a horizontal arm pivotally connected with said oscillatable arm on the shaft which is composed of two elements adjustably connected together, and a vertical pivot pin for connecting the arm operated by the cam with said horizontal arm.

26. In a labeling machine, the combination of means for holding a bottle, a shaft, a picker on said shaft, means for applying paste to the surface of said picker, means for then raising the shaft to bring the picker into contact with a label for receiving the label on its pasted surface and then moving the picker down to bring the label into contact with the top of the bottle, means for intermittently rotating said shaft, and means for periodically locking said shaft in fixed position.

27. In a labeling machine, the combination of means for holding a bottle, a picker, means for applying paste to the picker, means for then raising the picker into contact with a label for receiving the label on its pasted surface and then moving the picker down to bring the label into contact with the top of the bottle, a shaft on which said picker is located, a toothed disk on said shaft, a cam, an oscillatable arm, said disk being provided with a series of sockets for receiving said pin, whereby when in its lowermost position the pin will lock the disk and shaft.

28. In a labeling machine, the combination of means for holding a bottle in vertical position, a picker comprising a horizontal plate having pairs of parallel arms extending therefrom and spaced apart, means for applying paste to the upper sides of two of said arms simultaneously, and means for then raising the picker into contact with a label for receiving the label on its pasted surface and then moving the picker down to bring the center of the label into contact with the top of the bottle, and a label gripper arm movable into the space between the two picker arms, for engaging the center of a label and holding it on the top of a bottle.

29. In a labeling machine, the combination of a vertically reciprocable and intermittently rotatable picker plate having pairs of picker arms spaced apart for receiving paste and also for receiving the ends of a label which is adapted to be located across said space, means for moving said picker down to bring the center of the label on the top of a bottle, an oscillatable label gripper arm, means for moving said arm down over the center of the label and bottle, and a soft pad on the end of said arm for engaging the label.

30. In a labeling machine, the combination of a picker plate having a pair of picker arms spaced apart for receiving paste and also for receiving the ends of a label located across said space, means for moving said picker down to bring the center of the label on the top of a bottle, an oscillatable label gripper arm, means for positively moving said arm down over the center of the label and bottle, a soft pad on the end of said arm for engaging the label, and a pair of label benders movable down on opposite sides of the label grip for drawing the ends of the label from the picker and bending them down along the sides of the bottle neck.

31. In a labeling machine, the combination of a shaft, an arm on the shaft, a cam for oscillating said arm and the shaft to which it is fixed, a label grip freely pivoted on said shaft, means for moving said label grip, and a pair of label benders fixed on said shaft on opposite sides of the grip for bending the ends of a label down on the neck of a bottle.

32. In a labeling machine, the combination of a label grip, means for moving said label grip, a pair of label benders on opposite sides of the grip for bending the ends of a label down on the neck of a bottle, steering plates on said benders, and means for operating the benders.

33. In a labeling machine, the combination of a picker plate having a pair of picker arms spaced apart for receiving paste and also for receiving the ends of a label, means for moving said picker down to bring the center of the label on the top of a bottle, an oscillatable label gripper arm, means for positively moving said arm down over the center of the label and bottle, a soft pad on the end of said arm for engaging the label, a pair of label benders movable down on opposite sides of the label grip for drawing the ends of the label from the picker and bending them down along the sides of the bottle neck, and means for pressing the ends of the label against the bottle neck to permanently fix them thereto.

34. In a labeling machine, the combination of means for holding a bottle in vertical position, a picker comprising a horizontal plate having pairs of parallel arms extending therefrom and spaced apart, means for applying paste to the upper surfaces of two of said arms, means for then raising the picker into contact with a label for receiving the label on its pasted surface and then moving the picker down to bring the center of the label into contact with the top of the bottle, means for thereafter bending the ends of the label down against the bottle neck, and means for finally pressing said ends inwardly to permanently secure them thereto.

35. In a labeling machine, the combination of a pair of parallel shafts, means for oscillating one of said shafts, means for transmitting the oscillation to the other in the opposite direction, an arm projecting from each of said shafts and having ends arranged to extend toward each other and located in alinement, and a pair of presser pads on said arms for pressing the ends of a label against the opposite sides of a bottle.

36. In a labeling machine, the combination of a pair of parallel shafts, means for oscillating said shafts oppositely and simultaneously, an arm extending from each shaft and movable therewith, an arm freely mounted on each shaft, spring means for connecting the fixed arm to the free arm in each case, the free arms being provided with soft presser pads for pressing the ends of a label on opposite sides of a bottle.

37. In a labeling machine, the combination of a pair of vertical shafts, arms pivoted on said shafts and oscillatable independently thereof, means for oscillating said arms, means on the arms for gripping a bottle and holding it, a second set of arms fixed to said shafts, means for oscillating said shafts simultaneously in opposite directions, and means on the second set of arms for yieldingly pressing the ends of a label against opposite sides of a bottle while held by the first set of arms.

38. In a labeling machine, the combination of a pair of vertical shafts, a bell-crank construction pivoted on each of said shafts, one arm of each bell-crank being connected with one arm of the other to cause them to work simultaneously but oppositely, the other arm of one bell-crank having a presser pad adapted to engage a bottle, yielding means connected with the corresponding arm on the other shaft for engaging the other side of the bottle and holding it against said presser pad, a shaft, a cam on said shaft, and means connected with said cam for oscillating the bell crank on one of said vertical shafts.

39. The combination with a conveyer for a labeling machine, of a timing device therefor comprising an arm adapted to swing over the surface of the conveyer to stop articles thereon, a second arm opposite the first and connected therewith and movable oppositely to said first arm, the second arm also projecting over the surface of the conveyer, and means for applying a label to an article on said conveyer.

40. In a labeling machine, the combination with a conveyer for the articles to be labeled, of a timing device therefor comprising an arm having an end movable inwardly over the conveyer at one side, a second arm simultaneously movable inwardly at an opposite point on the other side of the conveyer, means for connecting said arms to cause them to move together, and means for applying a label to an article on said conveyer.

41. In a labeling machine, the combination with a conveyer for the articles to be labeled, of a timing device therefor comprising an arm having an end movable inwardly over the conveyer at one side, a second arm simultaneously movable inwardly at an opposite point on the other side of the conveyer, means for connecting said arms to cause them to move together, said means being adjustable to regulate the minimum space between said arms when they are projected inwardly, and means for applying a label to an article on said conveyer.

42. In a labeling machine, the combination with a conveyer for bottles, of a timing device located in position to be tripped by an advancing bottle standing upon the conveyer but high enough from the conveyer to avoid being tripped by a bottle on the conveyer in horizontal position, means for stopping the bottles, means operated by said timing device when tripped for withdrawing said stopping means, and means for applying a label to an article on said conveyer.

43. The combination of a movable carrier, a movable arm having a projection thereon, means for positively moving said arm to introduce said projection into the path of the articles on the carrier to stop the same, a latch movable with said arm, means whereby when said arm moves to its normal limiting position the latch will prevent it from moving back and positively hold the arm in that position, and means for applying a label to an article on said carrier.

44. The combination of a movable carrier, a movable arm having a projection thereon, means for positively moving said arm to introduce said projection into the path of the articles on the carrier, a latch movable with said arm, means whereby when said arm moves to its normal limiting position the latch will prevent the arm from moving back, said latch having a projection extending into the path of the articles on the carrier so located as to cause the latch to be released when the last named projection is engaged by an article on the carrier, whereby the arm is rendered capable of moving back to allow an article to proceed with the carrier, and means for applying a label to an article on said carrier.

45. The combination of a carrier, a movable arm having a projection thereon, means for moving said arm to introduce said projection into the path of the articles on the carrier, means whereby when said arm moves to its normal limiting position it will be prevented from moving back, a projection extending into the path of the articles on the carrier so located as to cause the arm to be released when the last named projection is engaged by an article on the carrier, and means for applying a label to an article on said carrier.

46. The combination with a carrier, of an oscillatable shaft, a bracket loosely mounted on said shaft, means for periodically oscillating said bracket, an arm fixed to said shaft, adjustable means on the bracket for engaging said arm and swinging it with the bracket in one direction, yielding means for connecting said arm with the bracket to hold the arm back against said adjustable means, a projecting end on the arm for moving into the path of the articles on the carrier and stopping them, and means for applying a label to an article on said carrier.

47. The combination with a carrier, of an oscillatable arm, independently movable means for engaging said arm and swinging it over the carrier, yielding means for holding the arm back, a projecting end on the arm for moving into the path of the articles on the carrier and stopping them, a latch mounted on the arm and adapted to hold the arm in its obstructing position unless an article on the carrier releases the latch, and means for applying a label to an article on said carrier.

In testimony whereof we have hereunto affixed our signatures.

JOHN EMANUEL JOHNSON.
CHARLES H. OSLUND.